United States Patent
Mano

(10) Patent No.: US 10,110,756 B2
(45) Date of Patent: Oct. 23, 2018

(54) IMAGE PROCESSING APPARATUS AND IMAGE PROCESSING METHOD

(71) Applicant: SEIKO EPSON CORPORATION, Tokyo (JP)

(72) Inventor: Takahiro Mano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/453,516

(22) Filed: Mar. 8, 2017

(65) Prior Publication Data

US 2017/0264754 A1   Sep. 14, 2017

(30) Foreign Application Priority Data

Mar. 9, 2016   (JP) .................. 2016-045291

(51) Int. Cl.
*H04N 1/00* (2006.01)
*H04N 1/32* (2006.01)

(52) U.S. Cl.
CPC ....... *H04N 1/00037* (2013.01); *H04N 1/0005* (2013.01); *H04N 1/00015* (2013.01); *H04N 1/00076* (2013.01); *H04N 1/00461* (2013.01); *H04N 1/00506* (2013.01); *H04N 1/32694* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0273942 A1* | 11/2007 | Miyata | ....................... | B41J 3/46 358/518 |
| 2012/0019852 A1* | 1/2012 | Ito | ....................... | G06K 15/027 358/1.13 |
| 2013/0286040 A1* | 10/2013 | Kawaguchi | .............. | H04N 1/60 345/601 |
| 2014/0232772 A1* | 8/2014 | Sasaki | ................... | B41J 2/2139 347/14 |
| 2015/0371126 A1* | 12/2015 | Ota | ....................... | G06K 15/408 358/1.14 |

FOREIGN PATENT DOCUMENTS

| | | |
|---|---|---|
| JP | 2007-118239 A | 5/2007 |
| JP | 2015-047837 A | 3/2015 |

\* cited by examiner

*Primary Examiner* — Moustapha Diaby
(74) *Attorney, Agent, or Firm* — Foley & Lardner LLP

(57) ABSTRACT

An image processing apparatus includes a printing instruction unit which instructs printing a plurality of times in which the same print data is printed on a plurality of media; an obtaining unit which obtains the number of printing failures in the printing of a plurality of times; a display unit which displays the number of defective items (low quality), and the number of defective items (incomplete items) by default, and with which it is possible to select whether or not to perform reprinting; and a CPU which controls the printing instruction unit so as to perform reprinting when reprinting is selected in the display unit.

12 Claims, 7 Drawing Sheets

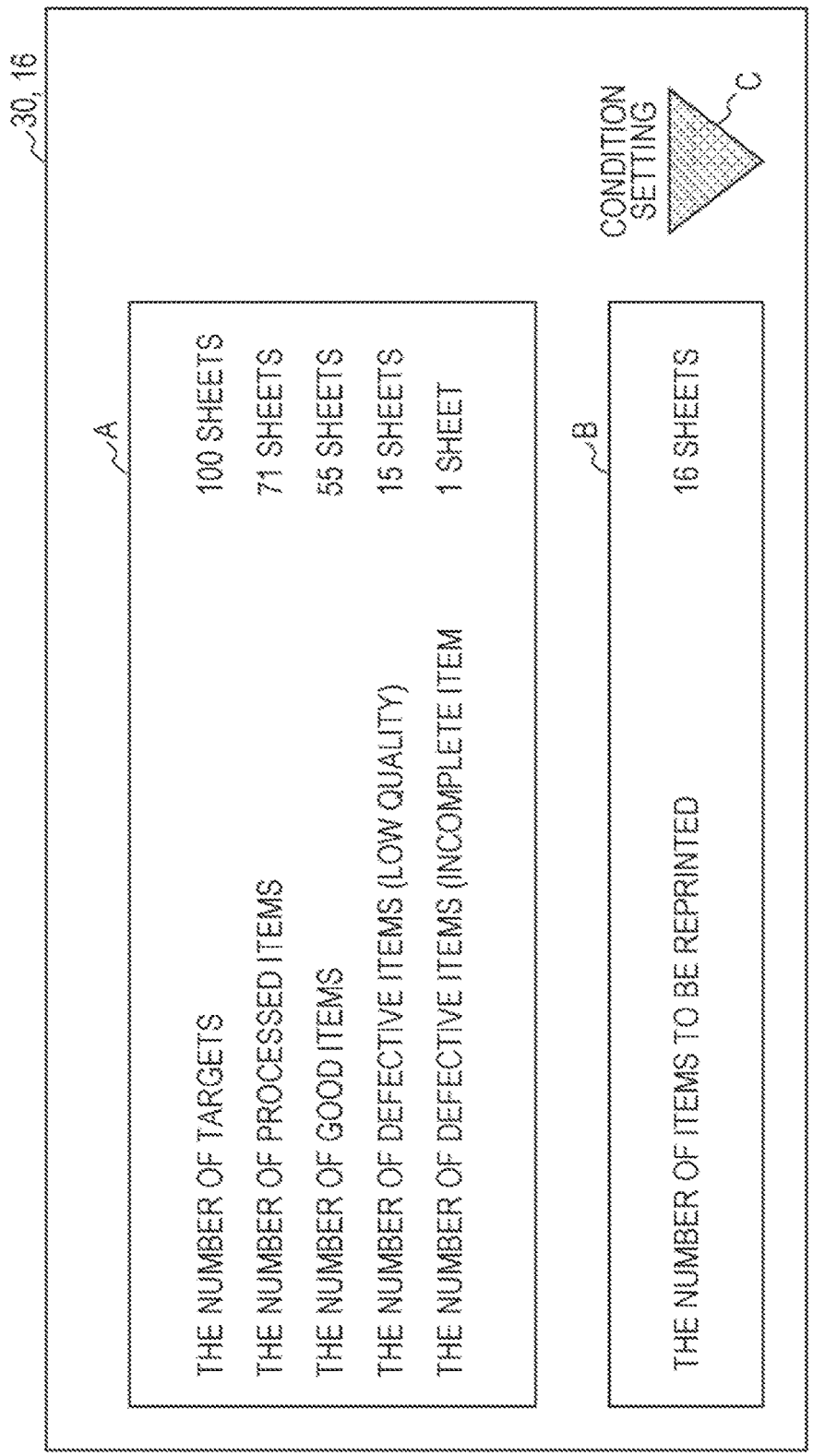

FIG. 6

[QUALITY OF IMAGE]

| | | | CHECK | | | | CHECK |
|---|---|---|---|---|---|---|---|
| LUMINANCE | RANK 1 | 50 SHEETS | | DOT OMISSION | RANK 1 | 50 SHEETS | ☑ 51, 52 |
| LUMINANCE | RANK 2 | 12 SHEETS | | DOT OMISSION | RANK 2 | 5 SHEETS | ☑ |
| LUMINANCE | RANK 3 | 8 SHEETS | ☑ | DOT OMISSION | RANK 3 | 5 SHEETS | |

| | | | CHECK |
|---|---|---|---|
| HUE | RANK 1 | 40 SHEETS | |
| HUE | RANK 2 | 20 SHEETS | |
| HUE | RANK 3 | 10 SHEETS | ☑ |

[ERROR ITEMS]

| | | CHECK 51 | | | CHECK | | | CHECK |
|---|---|---|---|---|---|---|---|---|
| SHEET JAMMING | 0 SHEETS | ☐ | OUT OF INK | 0 SHEETS | ☐ | OTHERS | 0 SHEETS | ☐ |
| SHEET SKEWING | 0 SHEETS | ☐ | FULL WASTE LIQUID TANK | 1 SHEET | ☑ | | | |

40, 16

IMAGE PROCESSING APPARATUS AND IMAGE PROCESSING METHOD

BACKGROUND

1. Technical Field

The present invention relates to an image processing apparatus and to an image processing method for the image processing apparatus.

2. Related Art

In the related art, an image processing apparatus which prints a desired image on a recording sheet (medium) is known (for example, JP-A-2007-118239).

The image processing apparatus (image processing apparatus system) described in JP-A-2007-118239 includes a reader unit which reads a document, a printer unit which records (prints), on a medium, a document image which is read in the reader unit, and an image input-output control unit which controls the reader unit and the printer unit.

An operator (user) inspects an image printed on a medium, and when the inspection result is not acceptable, the user designates a number of copies (number of sheets to be reprinted) in units of pages and performs reprinting.

Since a user performs an inspection, determines whether or not a printed image is acceptable, and performs reprinting by designating the number of media on which the image is of unacceptable quality, in the image processing apparatus system (image processing apparatus) which is described in JP-A-2007-118239, there has been a problem in that time and effort are required for inspection or for designating the number of media on which the image is of unacceptable quality in a case of printing the same print data on a plurality of media, and accordingly, printing productivity deteriorates.

SUMMARY

The invention can be realized by the following aspects or application examples.

Application Example 1

According to an aspect of the application example, there is provided an image processing apparatus which includes a printing instruction unit which instructs printing of the same print data on a plurality of media a plurality of times; an obtaining unit which obtains the number of printing failures in the printing performed a plurality of times; a display unit which displays the number of printing failures by default, and with which it is possible to select whether or not to perform reprinting; and a control unit which controls the printing instruction unit so as to perform reprinting when reprinting is selected in the display unit.

In a case in which the same print data is printed on a plurality of media, since the obtaining unit counts the number of printing failures, it is not necessary for a user to perform inspection and count the number of printing failures. In addition, since the display unit displays the number of printing failures by default, it is possible for a user to easily grasp the number of printing failures. Since it is possible to select whether or not to perform reprinting from the display unit, it is possible for a user to perform reprinting based on the number of printing failures, and accordingly, it is possible to increase printing productivity.

Application Example 2

In the image processing apparatus according to the application example, it is preferable that the display unit display an acquired condition setting screen on which conditions for reprinting are set.

Since conditions for reprinting are displayed on the acquired condition setting screen of the display unit, it is possible for a user to perform reprinting easily and appropriately by selecting the conditions for reprinting on the acquired condition setting screen.

Application Example 3

In the image processing apparatus according to the application example, it is preferable that an option to change the conditions based on luminance of a printed result be displayed on the acquired condition setting screen.

Since it is possible to properly evaluate whether or not a printed image is acceptable, and whether or not to perform reprinting on a medium, by evaluating the luminance of a printed result (luminance of reflected light of printed image), it is preferable that an option to change conditions for reprinting based on the luminance of the printed result be displayed on the acquired condition setting screen.

Application Example 4

In the image processing apparatus according to the application example, it is preferable that an option to change the conditions based on dot omission in the printed result be displayed on the acquired condition setting screen.

Since it is possible to properly evaluate whether or not a printed image is acceptable, and whether or not to perform reprinting on a medium, by evaluating dot omission in the printed result, it is preferable that an option to change conditions of reprinting based on dot omission in the printed result be displayed on the acquired condition setting screen.

Application Example 5

In the image processing apparatus according to the application example, it is preferable that an option to change the conditions based on hue of the printed result be displayed on the acquired condition setting screen.

Since it is possible to properly evaluate whether or not a printed image is acceptable, and whether or not to perform reprinting on a medium, by evaluating a hue of the printed result, it is preferable that an option to change conditions for reprinting based on hue of the printed result be displayed on the acquired condition setting screen.

Application Example 6

According to the application example, there is provided an image processing method which includes instructing printing of the same print data on a plurality of media a plurality of times; obtaining the number of printing failures in the printing performed a plurality of times; and displaying the number of printing failures by default and providing an option to perform reprinting, after which, reprinting is performed.

When the number of printing failures is displayed by default, it is possible for a user to easily grasp the number of printing failures. When the number of printing failures is displayed by default and reprinting is selected after displaying an option to select whether or not to perform reprinting, a user can perform reprinting based on the number of printing failures, and it is possible to increase printing productivity.

BRIEF DESCRIPTION OF THE DRAWINGS

The invention will be described with reference to the accompanying drawings, wherein like numbers reference like elements.

FIG. 5 is a schematic view which illustrates a state of a performance screen which is displayed on a display unit by default.

FIG. 6 is a schematic view which illustrates a state of an acquired condition setting screen which is displayed on the display unit.

DESCRIPTION OF EXEMPLARY EMBODIMENTS

Figure 1:
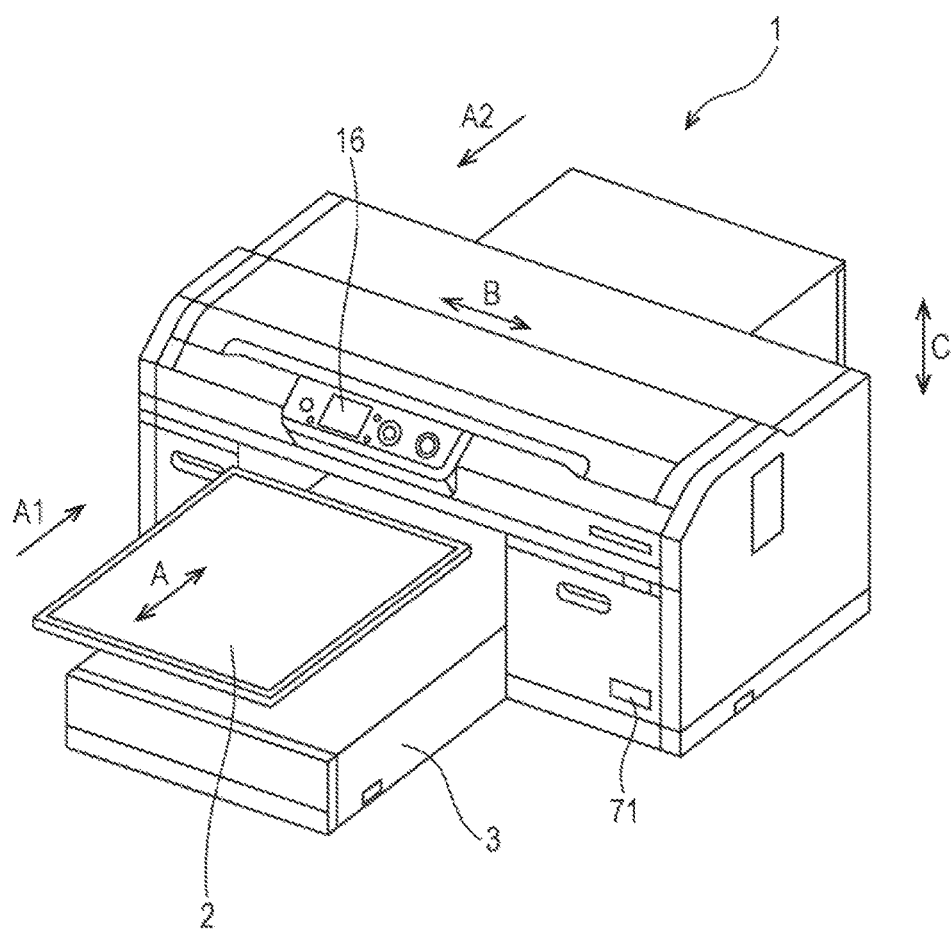
FIG. 1 is a schematic perspective view of an image processing apparatus according to an embodiment.

Hereinafter, an embodiment of the invention will be described with reference to the drawings. The embodiment is one embodiment of the invention, does not limit the invention, and can be arbitrarily modified within the scope of a technical concept of the invention. In each of the following drawings, since each layer or each portion is set to a size which can be recognized in the drawings, the scale of each layer or each portion may be different from actual scale.

Embodiment

Outline of Image Processing Apparatus

Figure 2:
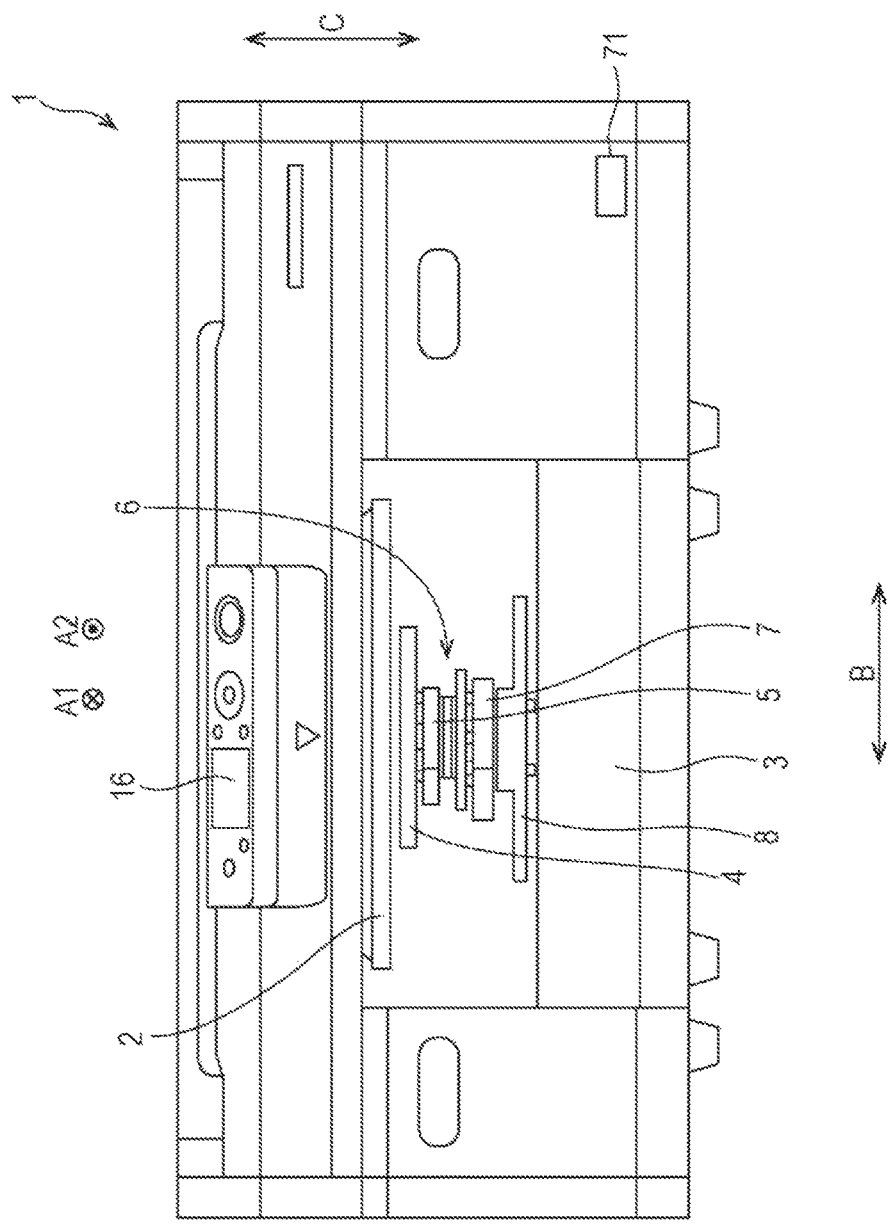
FIG. 2 is a schematic front view of the image processing apparatus according to the embodiment.
Figure 3:
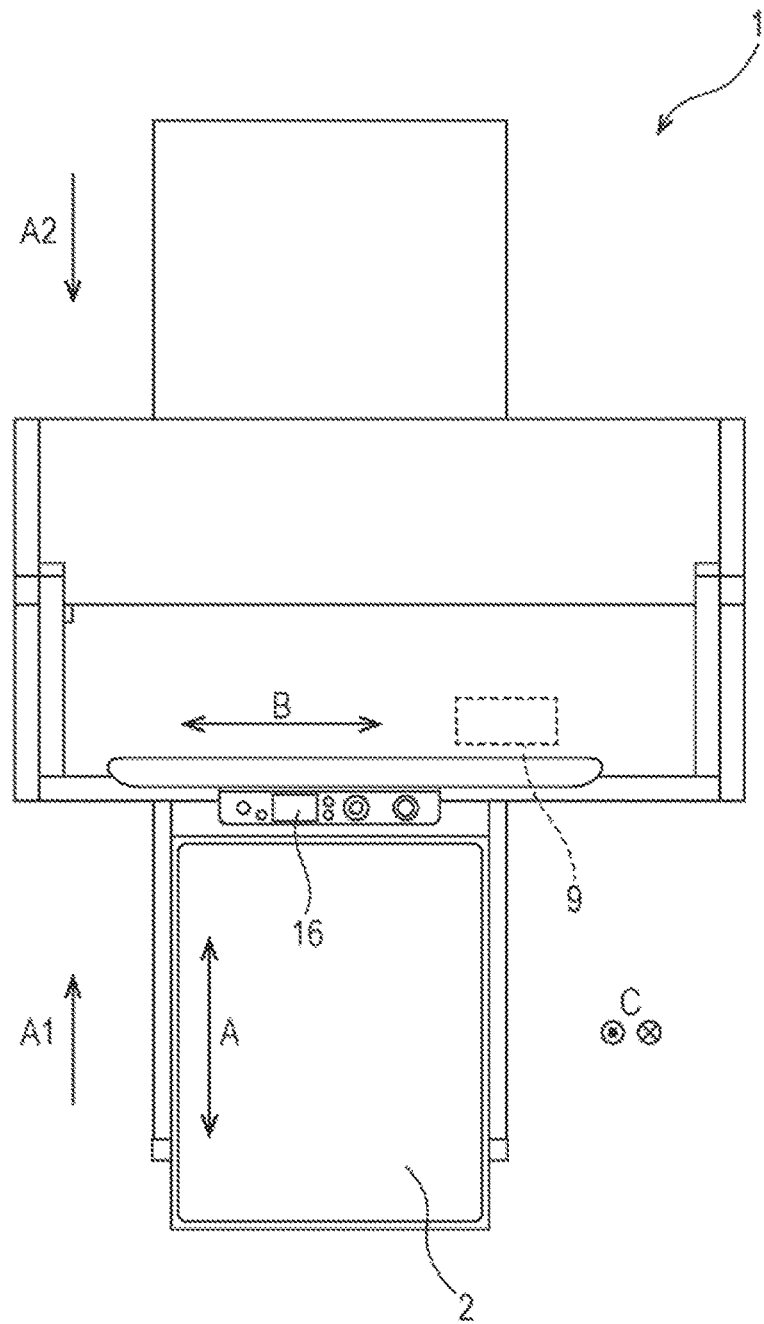
FIG. 3 is a schematic plan view of the image processing apparatus according to the embodiment.
Figure 4:
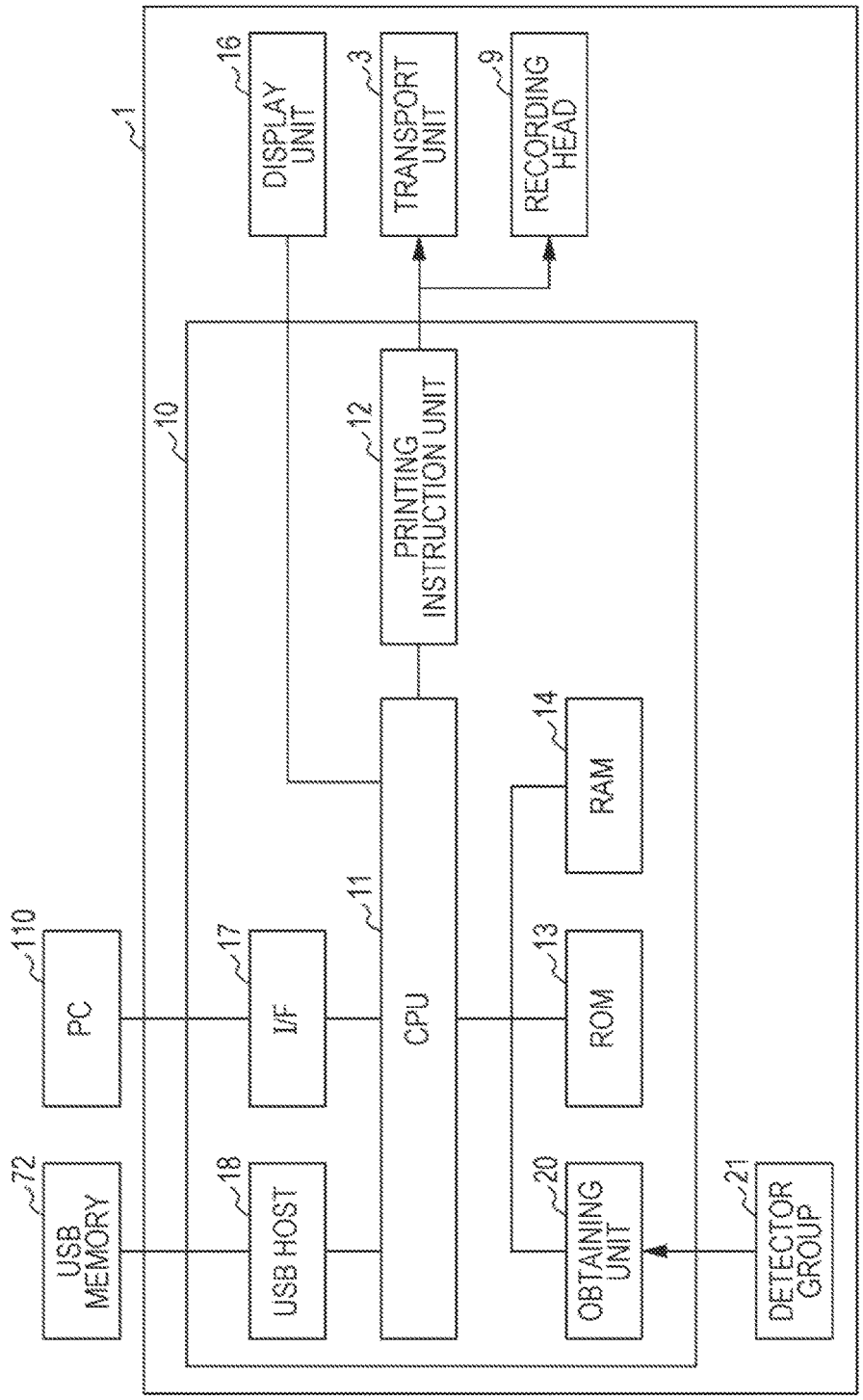
FIG. 4 is a block diagram which illustrates a configuration of the image processing apparatus according to the embodiment.

FIG. 1 is a schematic perspective view of an image processing apparatus according to an embodiment. FIG. 2 is a schematic front view of the image processing apparatus according to the embodiment. FIG. 3 is a schematic plan view of the image processing apparatus according to the embodiment. FIG. 4 is a block diagram which illustrates a configuration of the image processing apparatus according to the embodiment.

All of FIGS. 1 to 3 illustrate a state in which a tray 2 which can support a medium M is located at a set position for setting the medium M.

An image processing apparatus 1 according to the embodiment is a printing apparatus (recording apparatus) which prints, by employing an ink jet method, an image by ejecting ink onto the medium M, such as T-shirts, which is held on the tray 2, for example.

As illustrated in FIGS. 1 to 3, the image processing apparatus 1 is provided with the tray 2 on which the medium M on which an image is printed is set, a transport unit 3 which supports and moves the tray 2, a display unit 16 which displays a printed state and with which it is possible to set various conditions, an insertion port 71 into which a USB memory 72 (refer to FIG. 4) can be inserted, or the like. The transport unit 3 can transport the medium M which is set on the tray 2 in a transport direction A (setting direction A1 and direction A2 on a side opposite to setting direction A1). When performing printing on the medium M which is set at the setting position, printing is performed while moving the tray 2 on which the medium M is set from a printing start position in the direction A2, after the medium M is moved to the printing start position, by moving the tray 2 on which the medium M is set in the setting direction A1.

A substrate portion 8, a connecting mechanism 6, and a stage 4 are disposed in this order from the transport unit 3 side between the transport unit 3 and the tray 2. That is, the transport unit 3 supports the tray 2 via the substrate portion 8, the connecting mechanism 6, and the stage 4.

The stage 4 is a mounting table on which the tray 2 is mounted. The tray 2 can be detached from the stage 4. The connecting mechanism 6 includes adjusting levers 5 and 7 which connect to the stage 4 and the substrate portion 8 and are used to adjust the position of the stage 4 with respect to the substrate portion 8. The position of the medium M which is set on the tray 2 can be adjusted by the adjusting levers 5 and 7. The substrate portion 8 is supported by the transport unit 3, receives driving power from the transport unit 3, and transports the stage 4 and the connecting mechanism 6 in the transport direction A.

As illustrated in FIG. 3, a recording head 9 is provided inside a main body of the image processing apparatus 1. The recording head 9 is held by a carriage mechanism (not illustrated) and can move in a direction B which intersects the transport direction A of the medium M.

The recording head 9 includes a pressure generating chamber (not illustrated) in which ink is stored, a vibrating plate (not illustrated) and a piezoelectric element (not illustrated) which cause a pressure change in the ink in the pressure generating chamber, and a nozzle (not illustrated) which is caused to communicate with the pressure generating chamber, and ejects ink onto the medium M. In addition, a plurality of the nozzles are formed in the recording head 9.

For example, in a case in which the piezoelectric element is a longitudinal vibration mode piezoelectric actuator which expands or contracts in an axial direction, the piezoelectric element contracts when being charged and expands when being discharged. Due to expansion and contraction of the piezoelectric element, the vibrating plate vibrates, the pressure generating chamber contracts and expands, and ink is ejected from the nozzle.

The piezoelectric element and the vibrating plate control the position or shape of the ink meniscus (free surface of ink) which is exposed at the nozzle toward the medium M. When the piezoelectric element expands, the pressure generating chamber contracts, the ink meniscus is pushed outward, and ink is ejected from the nozzle. When the piezoelectric element contracts, the pressure generating chamber expands, the meniscus is pulled inward, and ejection of ink from the nozzle is suppressed.

The recording head 9 forms dots by causing ink to land on a target position of the medium M by repeating an operation of pushing the meniscus outward, an operation of attracting the meniscus, an operation of damping vibration of the meniscus (vibration of vibrating plate), an operation of restoring the volume of the pressure generating chamber to the original volume, or the like.

As illustrated in FIG. 4, in the image processing apparatus 1, a computer 110 (hereinafter, referred to as PC 110) and the USB memory 72 are connected so as to communicate with each other. Image data to be printed on the medium M is stored in the computer 110.

The image processing apparatus 1 is provided with a controller 10, a detector group 21, or the like, in addition to the above described transport unit 3, recording head 9, and display unit 16.

The detector group 21 consists of a colorimeter, various sensors, or the like, for example, and monitors the state of the image processing apparatus 1 or the medium M, and the state (quality) of an image printed on the medium M.

The controller 10 controls the entire image processing apparatus 1 and is provided with an I/F 17, a USB host 18, a CPU 11, a printing instruction unit 12, a ROM 13, a RAM 14, an obtaining unit 20, and the like. The I/F 17, the USB host 18, the CPU 11, the printing instruction unit 12, the ROM 13, the RAM 14, the obtaining unit 20, and the like, are connected to each other via a bus.

The I/F 17 performs transceiving of data between the PC 110 and the image processing apparatus 1. The USB host 18 is an interface circuit for accessing the USB memory 72. The CPU 11 is an example of a "control unit" and controls the printing instruction unit 12 so as to perform reprinting when reprinting is selected, for example. The printing instruction unit 12 controls the transport unit 3, the recording head 9, and the like. The ROM 13 is a storage medium (non-volatile memory) in which a program or various information for operating the CPU 11 is stored. The RAM 14 is a storage medium (volatile memory) which temporarily stores various data items which are operation results or processing results of the CPU 11.

The CPU 11 performs image processing such as resolution conversion processing, color conversion processing, halftone processing, microwave processing, or the like by executing the program stored in the ROM 13.

In the resolution conversion processing, image data stored in the PC 110 is converted to a designated resolution at a time of performing printing on the medium M. For example, in a case in which a printing resolution is designated as 1440 dpi×720 dpi, image data stored in the PC 110 is converted into image data with a resolution of 1440 dpi×720 dpi.

In the color conversion processing, image data which is subjected to resolution conversion processing is converted into data of grayscale values of each color of ink used in the image processing apparatus 1. In the color conversion processing, for example, image data which is subjected to resolution conversion processing is converted into pixel data of 256 grayscale values.

In the halftone processing, the color data of each pixel subjected to color conversion processing is converted into image data of four grayscale values corresponding to the number of grayscale values which the image processing apparatus 1 can produce. The image data of four grayscale values after the halftone processing becomes dot data denoting the size of a dot which is formed for a corresponding pixel. Specifically, the pixel data becomes dot data denoting a large dot, a medium dot, a small dot, or no dot.

In the microwave processing, interlace processing is performed with respect to dot data, and the dot data is converted into print data which can be processed in the image processing apparatus 1.

The CPU 11 controls the printing instruction unit 12 so that the transport unit 3 and the recording head 9 execute printing processing. That is, the printing instruction unit 12 executes printing processing in which a desired image is printed on the medium M based on an instruction by the CPU 11 by reading print data which is generated by the microwave processing, controlling the transport unit 3 and the recording head 9, and alternately repeating an operation of ejecting ink onto the medium M while causing the recording head 9 to reciprocate in the direction B and an operation of transporting the medium M in the direction A2.

For example, in a case of performing printing in which the same print data is printed on the plurality of media M a plurality of times, the printing instruction unit 12 instructs the transport unit 3 and the recording head 9 to perform printing a plurality of times.

The CPU 11 and the printing instruction unit 12 can print a desired image on the medium M by reading image data stored in the USB memory 72 and generating print data in the image processing. That is, the image processing apparatus 1 can print a desired image on the medium M based on the image data stored in the USB memory 72, in addition to the image data stored in the PC 110.

The USB memory 72 is an external storage device (non-volatile memory) and can be attached to the image processing apparatus 1 through the insertion port 71. That is, it is possible to connect the USB memory 72 to the CPU 11 via the USB host 18.

In a case in which jamming of the medium M (paper jam) occurs (hereinafter, referred to as a sheet jam), a case in which a waste liquid tank (not illustrated) is full (hereinafter, referred to as a full waste liquid tank), and a case in which a failure such as a defect of the recording head 9 occurs, a user restarts printing on the medium M by turning on power of the image processing apparatus 1 after turning off the power of the image processing apparatus 1 and restoring the image processing apparatus 1 to a default state.

When power of the image processing apparatus 1 is turned off, data which is temporarily stored in the RAM 14 is lost since the RAM 14 is volatile memory. For this reason, in the image processing apparatus 1, data stored in the RAM 14 is transferred to the USB memory 72 and stored before power is turned off. When the image processing apparatus 1 is restored to the default state by turning the power on, the CPU 11 reads data stored in the USB memory 72 and causes printing on the medium M to be restarted.

Since power is turned off after data which is stored in the RAM 14 has been stored in the USB memory 72, the data is not lost even when the power is turned off. In addition, since the data stored in the USB memory 72 is read and printing on the medium M is restarted when power is turned on, it is possible to rapidly restart printing on the medium M compared to a case in which data stored in the RAM 14 is lost when power is turned off.

In addition, the external storage device which is connected to the image processing apparatus 1 is not limited to the USB memory 72 and may be a hard disk drive (HDD) or a memory card, for example.

Outline of Obtaining Unit

An obtaining unit 20 evaluates a state of the medium M, or a state of an image printed on the medium M, based on information from the detector group 21. For example, the obtaining unit 20 obtains error information such as skewing of the medium M (hereinafter, referred to as sheet skewing), sheet jamming, out of sheets, out of ink, and a full waste liquid tank from the detector group 21. In addition, the obtaining unit 20 obtains information on the quality of an image printed on the medium M, based on information from the detector group 21.

For example, when errors such as sheet skewing, sheet jamming, out of ink, and a full waste liquid tank occur, printing operation is stopped and printing on the medium M is not completed. The obtaining unit 20 obtains the number of media M on which printing is not completed due to errors such as sheet skewing, sheet jamming, out of ink, and a full waste liquid tank. The number of media M on which printing is not completed is displayed on the display unit 16 by default as the number of defective items (incomplete items).

The recording head 9 forms dots of any one size of a large dot, a medium dot, and a small dot on the medium M based on dot data denoting any one of a large dot, a medium dot, a small dot, and no dot. For example, in a case in which the recording head 9 is defective and a dot size to be formed on the medium M varies, color shading occurs in the printed image. For example, in a case in which ink ejected from the recording head 9 does not land on a target position, the density of dots formed on the medium M varies, and color shading occurs in a printed image.

For this reason, the obtaining unit 20 evaluates color shading in a measured portion of the printed image as luminance based on information from the detector group 21 (colorimeter).

The "luminance" in the application is the luminance of reflected light of a printed image and corresponds to shading of a color. For example, a state in which a color is pale corresponds to a state in which luminance of an image is high, and a state in which a color is dark corresponds to a state in which luminance of an image is low.

In a case in which the same print data is printed on a plurality of the media M, the obtaining unit 20 evaluates the degree of difference in luminance (difference in shading of color) in the respective plurality of media M by ranking luminance on a scale of 1 to 3 based on the difference from a reference value by setting a mean value of luminance obtained in a measuring portion of the plurality of media M to the reference value. A rank of 1 is a state in which the difference in luminance with respect to the reference value (difference in shading of color) is not visually discernable. A rank of 2 or 3 denotes a state in which the difference in luminance with respect to a reference value (difference in shading of color) is visually discernable. In addition, it is easy to visually discern a difference in luminance with respect to a reference value, and quality related to luminance decreases from a rank of 1 to a rank of 3.

Whether or not an image printed on the medium M is acceptable is determined depending on an inspection standard. According to the embodiment, in a case in which a difference in luminance with respect to a reference value is the rank 1 or the rank 2, it is determined as a good item of which a state of luminance is acceptable. In a case in which a difference in luminance with respect to the reference value is the rank 3, it is determined as a defective item of which a state of luminance is bad.

The obtaining unit 20 classifies a difference in luminance with respect to a reference value into the rank 1 to the rank 3, counts the number of media M of the respective ranks, and obtains the number of good items of which a state of luminance is acceptable, and the number of defective items (number of times of printing failure) of which a state of luminance is bad.

Hereinafter, a case in which a degree of difference in luminance with respect to a reference value is the rank 1 is referred to as a luminance rank 1, a case in which a degree of difference in luminance with respect to a reference value is the rank 2 is referred to as a luminance rank 2, and a case in which a degree of difference in luminance with respect to a reference value is the rank 3 is referred to as a luminance rank 3.

In addition, a degree of difference in luminance (difference in shading of color) may be evaluated in each of the plurality of media M using a difference with respect to the reference value, by registering the reference value of luminance in the ROM 13.

For example, a defect in which ink is not normally ejected from a nozzle of the recording head 9 occurs due to a reason such as an increase in viscosity of ink, mixing of bubbles into ink, adhering of foreign substances to a nozzle, or the like. When the defect in which ink is not normally ejected occurs in the plurality of nozzles which are formed in the recording head 9, a portion in which dots are not normally formed (hereinafter, referred to as dot omission) occurs, in an image printed on the medium M.

As described above, the recording head 9 forms dots on the medium M by repeating an operation of pushing meniscus outward, an operation of attracting the meniscus, an operation of damping a vibration of the meniscus (vibration of vibrating plate), an operation of restoring a volume of the pressure generating chamber to the original volume, or the like. For this reason, the recording head 9 causes the vibrating plate to perform damped vibration between ejecting of ink from a nozzle and ejecting of subsequent ink from the nozzle. By evaluating the damped vibration of the vibrating plate, it is possible to grasp the number of nozzles which cause dot omission without normally ejecting ink.

The obtaining unit 20 obtains the number of nozzles which cause dot omission without normally ejecting ink, in each of the plurality of media M from a state of damped vibration (residual vibration) of the vibrating plate, by observing the state of damped vibration (residual vibration) of the vibrating plate.

In a case of printing the same print data on the plurality of media M, the obtaining unit 20 evaluates a degree of dot omission by classifying thereof into the rank 1 to the rank 3, from the number of nozzles which causes dot omission without normally ejecting ink. The rank 1 is a state in which all of the nozzles are normal (state in which dot omission does not occur). The ranks 2 and 3 are states in which a nozzle which does not normally eject ink is present (state in which dot omission occurs). In addition, the number of nozzles which cause dot omission without normally ejecting ink increases, and quality related to dot omission deteriorates when the degree goes toward the rank 3 from the rank 1.

Whether or not an image printed on the medium M is acceptable is determined by the inspection standard. According to the embodiment, in a case in which a degree of dot omission is the rank 1, an image is determined as a good item of which a printing state is acceptable. In a case in which a degree of dot omission is the ranks 2 and 3, an image is determined as a defective item of which a printing state is poor.

The obtaining unit 20 classifies a degree of dot omission into the rank 1 to the rank 3, counts the number of media M of respective ranks, and obtains the number of good items of which a state of dot omission is acceptable, and the number of defective items (number of times of printing failure) of which a state of dot omission is bad.

Hereinafter, a case in which a degree of dot omission is the rank 1 is referred to as a dot omission rank 1, a case in which a degree of dot omission is the rank 2 is referred to as a dot omission rank 2, and a case in which a degree of dot omission is the rank 3 is referred to as a dot omission rank 3.

The number of nozzles which cause dot omission without normally ejecting ink, optically, may be grasped by observing an ejecting state of ink in each of the plurality of nozzles which are provided in the recording head 9. For example, the number of nozzles which cause dot omission may be grasped by observing a state of dots which are formed on the medium M.

In a case in which a type of ink, a type of the medium M, an environmental condition such as a temperature or a humidity, and the like, are different, for example, a state of dots formed on the medium M is changed, and a hue of a printed image is changed.

For this reason, the obtaining unit 20 evaluates a hue of a printed image based on information from the detector group 21 (colorimeter).

Specifically, a reference color such as the Pantone (registered trade mark) color sample book or the DIC color guide (registered trade mark) is registered in the ROM 13. The obtaining unit 20 firstly obtains a hue of an image printed at a measuring portion of the medium M as a Lab value of a Lab color space, and subsequently evaluates a degree of a difference in hue of the image printed at the measuring portion of the medium M, using a difference with respect to the reference color (distance from reference color in Lab color space).

In a case of printing the same print data on the plurality of media M, the obtaining unit 20 evaluates a degree of difference in hue of an image printed on the medium M by classifying thereof into the rank 1 to the rank 3, using a distance from a reference color in the Lab color space. The rank 1 is a state in which a difference in hue with respect to the reference color is not visually recognized. The rank 2 and the rank 3 are states in which a different in hue with respect to the reference color is visually recognized. In addition, when the degree goes toward the rank 3 from the rank 1, a distance from the reference color in the Lab color space becomes long, a difference in hue with respect to the reference color is visually recognized, easily, and a quality related to the hue deteriorates.

Whether or not an image printed on the medium M is acceptable or defective is determined by the inspection reference. According to the embodiment, in a case in which a difference in hue with respect to the reference color is the rank 1 or 2, it is determined as a good item of which a printing state is good. In a case in which a difference in hue with respect to the reference color is the rank 3, it is determined as a defective item of which a printing state is bad.

The obtaining unit 20 classifies a difference in hue with respect to the reference color into the rank 1 to the rank 3, counts the number of media M in respective ranks, and obtains the number of good items of which a state of hue is good, and the number of defective items (number of times of printing failure) of which a state of hue is poor.

Hereinafter, a case in which a difference in hue with respect to the reference color is the rank 1 is referred to as a hue rank 1, a case in which a difference in hue with respect to the reference color is the rank 2 is referred to as a hue rank 2, and a case in which a difference in hue with respect to the reference color is the rank 3 is referred to as a hue rank 3.

In addition, a degree of a difference in hue may be evaluated, using a difference with respect to the reference color (distance from reference color in Lab color space) by setting a mean value of a Lab value obtained at a measuring portion of the plurality of media M to the reference color.

The obtaining unit 20 determines that the medium M is a good item in a case in which the medium is a good item of which a printing state is entirely good in three evaluation items of luminance, dot omission, and a hue, and obtains the number of media M which are determined as a good item. The number of media M determined as a good item is displayed on the display unit 16 by default as the number of good items.

The obtaining unit 20 determines that the medium M is a defective item in a case in which the medium is a defective item of which a printing state is poor in any one of the three evaluation items of luminance, dot omission, and a hue, and obtains the number of media M which are determined as a defective item. The number of media M determined as the defective item is displayed on the display unit 16 by default as the number of defective items (low quality).

In this manner, the obtaining unit 20 obtains the number of defective items (low quality) and the number of defective items (incomplete items) in a case of performing printing a plurality of times in which the same data is printed on the plurality of media M. In addition, the number of defective items (low quality) and the number of defective items (incomplete items) are examples of "the number of times of printing failure".

Since whether the medium M is a good item or a defective item is determined by the obtaining unit 20, and it is not necessary for a user to determine thereof, a burden of a user is relieved, and it is possible to increase efficiency (productivity) in a printing work. In addition, it is possible for a user to grasp the number of good items and defective items in real time using the display unit 16.

The obtaining unit 20 evaluates a quality of an image printed on the medium M using three evaluation items such as luminance, dot omission, and a hue; however, it is not limited to this. The number of items for evaluating a quality of an image may be larger than three items, or may be smaller than three items.

In addition, the obtaining unit 20 evaluates a degree of a quality (good or bad in quality) of an image by classifying thereof into three ranks of the rank 1 to the rank 3 in each of the three evaluation items such as luminance, dot omission, and a hue of an image; however, it is not limited to this. The number of ranks in which a degree of a quality (good or bad in quality) of an image is classified may be larger than three ranks, or may be smaller than three ranks.

Outline of Display Unit

The display unit 16 is configured of a liquid crystal display device including a touch panel, for example. The display unit 16 displays a state of the image processing apparatus 1, and can give various instructions to the controller 10 using the touch panel.

FIG. 5 is a schematic diagram which illustrates a state of a performance screen which is displayed on the display unit by default. FIG. 6 is a schematic diagram which illustrates a state of an acquired condition setting screen which is displayed on the display unit.

FIGS. 5 and 6 are examples of a screen displayed on the display unit 16 in a case in which the target number of media M for printing the same data is 100 sheets, printing on 70 media M is finished, and printing on the 71th medium M is stopped halfway due to an error.

As illustrated in FIG. 5, two display regions A and B which are surrounded with a solid line, and the icon C are set on the performance screen 30 of the display unit 16.

The number of targets, the number of processed items, the number of good items, the number of defective items (low quality), and the number of defective items (incomplete items) are displayed in the region A by default.

The number of targets is the number of media M for printing the same image in a case of printing the same image. The number of targets is set by a user before starting printing on the medium M.

The number of processed items is the number of media M on which printing is finished in a case of printing the same image. The number of processed items is obtained by adding up the number of good items, the number of defective items (low quality), and the number of defective items (incomplete items).

According to the embodiment, it is displayed in the region A that the number of targets is 100 sheets, the number of processed items is 71 sheets, and the number of good items is 55 sheets, the number of defective items (low quality) is 15 sheets, and the number of defective items (incomplete items) is 1 sheet.

In the region B, the number of sheets to be reprinted is displayed by default. The number of sheets to be reprinted is the number of media M which are selected so as to be reprinted on an acquired condition setting screen 40 (refer to FIG. 6) which will be described later. It is denoted in the region B that the number of sheets to be reprinted is 16 sheets.

The icon C is an icon for moving to the acquired condition setting screen 40 from the performance screen 30, and the display unit 16 is switched from the performance screen 30 to the acquired condition setting screen 40 when a user touches the icon C.

In a case in which the same image is printed on the plurality of media M, since the number of targets, the number of good items, the number of defective items (the number of times of printing failure), and the number of sheets to be reprinted are displayed on the performance screen 30 by default, it is possible for a user to grasp a progress state of printing in real time, and it is possible to perform efficient printing in which wasteful printing is suppressed.

For example, it is possible to suppress waste in which the number of good items becomes larger than the number of targets, waste in which the number of good items becomes smaller than the number of targets, and additional printing is performed, or the like.

For example, in a case in which it is possible to grasp abnormality of the image processing apparatus 1 from a situation in which defective items are generated, and a user determines that the image processing apparatus 1 is abnormal, it is possible to suppress waste in which lots of defective items are generated, by stopping printing on the medium M, and restarting printing on the medium M after restoring the image processing apparatus 1 to a default state using maintenance, or the like.

As illustrated in FIG. 6, two display regions of regions D and E surrounded with a solid line are set in the acquired condition setting screen 40 of the display unit 16.

In the region D, a degree of a quality (good or bad in quality) of respective items are classified into the rank 1 to the rank 3, related to three items of luminance of a printed result, dot omission of a printed result, and a hue of a printed result, and the number of media M corresponding to the respective ranks is denoted. According to the embodiment, it is denoted that the number of media M of which luminance is the rank 1 is 50 sheets, the number of media M of which luminance is the rank 2 is 12 sheets, the number of media M of which luminance is the rank 3 is 8 sheets, the number of media M of which dot omission is the rank 1 is 60 sheets, the number of media M of which dot omission is the rank 2 is 5 sheets, the number of media M of which dot omission is the rank 3 is 5 sheets, the number of media M of which a hue is the rank 1 is 40 sheets, the number of media M of which a hue is the rank 2 is 20 sheets, and the number of media M of which a hue is the rank 3 is 10 sheets.

In addition, a square checkbox 51 denoted by a solid line is provided near the number of media M in the items which are determined as defective items (luminance rank 3, dot omission rank 2, dot omission rank 3, and hue rank 3). The checkbox 51 enables a user to select whether or not to perform reprinting, and sets conditions of reprinting (the number of media M to be reprinted).

That is, in the acquired condition setting screen 40 of the display unit 16, whether or not to change conditions for reprinting based on luminance of a printed result is displayed so as to be selected, whether or not to change conditions for reprinting based on dot omission of a printed result is displayed so as to be selected, and whether or not to change conditions for reprinting based on hue of a printed result is displayed so as to be selected.

Since it is not necessary for the items which are determined as good items (luminance rank 1, luminance rank 2, dot omission rank 1, hue rank 1, and hue rank 2) to be set so as to select whether or not to perform reprinting, the checkbox 51 is not provided. Since it is possible to identify an item determined as a defective item and an item determined as a good item depending on a presence or absence of the checkbox 51, a user can reliably identify an item as a defective item, and can reliably select reprinting with respect to the item as a defective item.

The checkbox 51 may be provided in both of the item determined as a defective item and the item determined as a good item.

The checkbox 51 enables a user to select whether or not perform reprinting, and in which conditions for reprinting (the number of media M to be reprinted) are sets. In a case of determining that it is necessary to perform reprinting, a user touches the checkbox 51, a check mark 52 is displayed in the checkbox 51, and reprinting of the medium M is selected.

In the region D, the medium M of which the check mark 52 is selected in at least one of the checkbox 51 of items which are determined as defective items (luminance rank 3, dot omission ranks 2 and 3, and hue rank 3) is determined as the medium M to be reprinted, and is added up as the number of media M to be reprinted in the region B of the performance screen 30.

In this manner, the display unit 16 displays the performance screen 30 which displays the number of defective items (the number of printing failure) by default, and the acquired condition setting screen 40 with which it is possible to select whether or not to perform reprinting. A user can select whether or not perform reprinting, and conditions when performing reprinting (the number of media M to be reprinted) using the checkbox 51 provided in the acquired condition setting screen 40. When reprinting is selected in the display unit 16, the CPU 11 controls the printing instruction unit 12 so that the transport unit 3 and the recording head 9 perform reprinting.

According to the embodiment, reprinting is selected in all of defective items of the luminance rank 3, the dot omission ranks 2 and 3, and the hue rank 3.

In addition, it is not necessary to select reprinting in all of defective items of the luminance rank 3, the dot omission ranks 2 and 3, and the hue rank 3. For example, in a case in which a user determines that there is a possibility that the dot omission rank 2 becomes a good item, the checkbox 51 of the dot omission rank 2 may not be selected.

Specifically, in a case in which an inspection reference for determining a good item and a defective item is ambiguous, a user performs reprinting by selecting a checkbox 51 of an item which is determined as an obvious defective item. The user performs a close inspection with respect to an inspection result of a medium M of which a determination on a defective item is ambiguous, selects the checkbox 51 in a case of determining that the determination on the defective item is correct, and performs reprinting. A user performs a close inspection with respect to an inspection result of a medium M of which a determination on a defective item is ambiguous, does not select the checkbox 51 in a case of determining that the determination on the defective item is incorrect, and does not perform reprinting. As a result, it is possible to suppress waste of disposing a medium M which is a good item as a defective item.

Error items in which printing becomes incomplete such as sheet jamming, sheet skewing, out of ink, a full waste liquid tank, and the checkbox 51 which enables a user to select reprinting with respect to each error item are provided in the region E. In the error items in which printing is not completed, the number of media M of which printing is not completed are denoted, and a user can select reprinting on the medium M using the checkbox 51 in a case of determining that it is necessary to perform reprinting.

According to the embodiment, since printing is stopped halfway due to a full waste liquid tank, and becomes incomplete, the number of medium M of which printing is incomplete due to the full waste liquid tank is denoted as one sheet. Since a user determines that it is necessary to perform reprinting, the check mark 52 is denoted in the checkbox 51 denoting the full waste liquid tank.

In addition, when reprinting is selected in the checkbox 51 in the region E, and the check mark 52 is denoted in the checkbox 51, it is added up as the number of sheets to be reprinted in the region B on the performance screen 30.

According to the embodiment, since it is determined that it is necessary to perform reprinting in both of the media M of 15 sheets which are added up as the number of defective items (low quality) and the medium M of 1 sheet which is added up as the number of defective items (incomplete items), it is denoted in the region B on the performance screen 30 that the number of sheets to be reprinted is 16 sheets (refer to FIG. 5)

Image Processing Method

Figure 7:
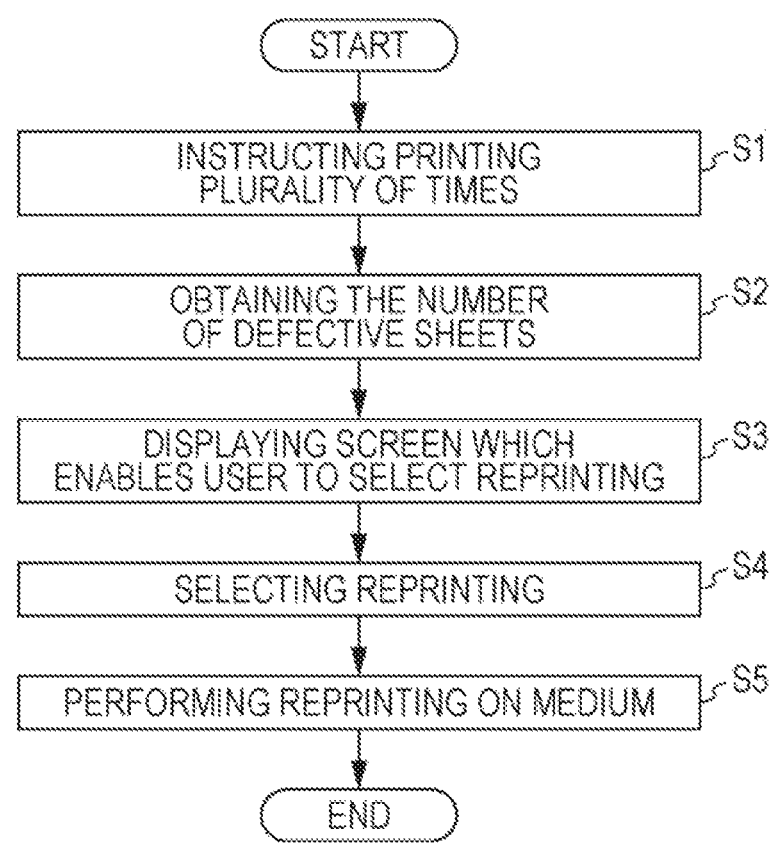
FIG. 7 is a process flowchart which illustrates an image processing method according to the embodiment.

FIG. 7 is a process flowchart which illustrates an image processing method according to the embodiment.

As illustrated in FIG. 7, the image processing method according to the embodiment includes instructing printing a plurality of times in which the same print data is printed on a plurality of media M (step S1); obtaining the number of defective items (the number of printing failures) in the printing performed a plurality of times (step S2); displaying in which the number of defective items (the number of printing failures) is displayed by default, and with which it is possible to select whether or not to perform reprinting (step S3), selecting reprinting after displaying (step S4), and performing reprinting, when reprinting is selected after the displaying (step S5).

In step S1, in a case in which the same print data is printed on the plurality of media M, a user touches an icon (not illustrated) for starting printing after inputting the number of plurality of media M (the number of targets) on which the same print data is printed, on a condition setting screen (not illustrated) of the display unit 16, and starts printing on the plurality of media M.

The number of plurality of media M (the number of targets) on which the same print data is printed is denoted as the number of targets in the region A on the performance screen 30 on which the number of targets is displayed by default, of the display unit 16 (refer to FIG. 5).

In a case in which printing on the plurality of media M is started, a user sets the medium M in the tray 2, and performs printing on the medium M. When printing on the medium M is finished, a user extracts the medium M on which an image is printed, sets a new medium M in the tray 2, and perform printing on the new medium M.

In step S2, the obtaining unit 20 evaluates a quality of a printed image based on information from the detector group 21, and obtains the number of good items, the number of defective items (low quality), and the number of defective items (incomplete items).

In step S3, the CPU 11 displays information obtained from the obtaining unit 20 on the display unit 16. As a result, in the region A on the performance screen 30 of the display unit 16, the number of good items, the number of defective items (low quality), and the number of defective items (incomplete items) are displayed by default (refer to FIG. 5). In addition, on the acquired condition setting screen 40 of the display unit 16, the checkbox 51 which enables a user to select whether or not to perform reprinting, and the number of media M as a target of reprinting are displayed in respective item which is determined as a defective item (low quality) and item which is determined as a defective item (incomplete item) (refer to FIG. 6).

In step S4, a user touches the checkbox 51 of an item in which it is necessary to perform reprinting, displays the check mark 52 in the checkbox 51, and selects reprinting on the medium M.

In addition, when determining that the image processing apparatus 1 is abnormal from a change in the number of defective items (low quality), the user selects reprinting on the medium M after performing maintenance of the image processing apparatus 1 (for example, cleaning of recording head 9), and restoring the image processing apparatus 1 to a default state.

In step S5, the CPU 11 controls the printing instruction unit 12 so that the transport unit 3 and the recording head 9 perform reprinting. The transport unit 3 and the recording head 9 perform reprinting on the medium M based on an instruction from the printing instruction unit 12.

In the image processing method according to the embodiment, since performing reprinting (step S5) is included when reprinting is selected on the acquired condition setting screen 40, after displaying of the performance screen 30 on which the number of defective items is displayed by default, and the acquired condition setting screen 40 which enables a user to select whether or not to performs reprinting on the display unit 16 (step S3), a user can suppress waste in which lots of defective items are generated due to abnormality of the image processing apparatus 1, since it is possible to grasp abnormality of the image processing apparatus 1 from a change in the number of defective items, and perform reprinting on the medium M after restoring the image processing apparatus 1 to a default state using maintenance or the like.

The invention is not limited to the above described embodiment, can be appropriately modified in a range of not being contrary to scopes or ideas of the invention which can be read from the entire claim and specification, and various modification examples can be taken into consideration in addition to the above described embodiment. Hereinafter, the invention will be described, using modification examples.

Modification Example 1

In the image processing apparatus 1, a user manually sets a medium M on the tray 2, and manually extracts the medium M on which an image is printed from the tray 2; however, it is not limited to the configuration. It may be a configuration in which transporting such as supplying of a medium M to a portion at which printing is performed on the medium M (printing portion), or extracting of the printed medium M is automatically performed on the apparatus side.

Modification Example 2

It may be a configuration in which the performance screen 30 and the acquired condition setting screen 40 are not displayed on the display unit 16 of the image processing apparatus 1, and are displayed on a display of the computer 110. That is, it may be a configuration in which the performance screen 30 and the acquired condition setting screen 40 are displayed on a display unit which is provided separately from the image processing apparatus 1. For example, it may be a configuration in which the checkbox 51 which enables a user to select whether or not to perform reprinting is displayed on the display of the computer 110, and a user selects the checkbox 51 through a mouse or a keyboard.

Modification Example 3

The recording head 9 is a serial head which ejects ink while moving in the width direction (direction B) of the medium M; however, it is not limited to this. For example, the recording head 9 may be a line head which extends in the width direction (direction B) of the medium M, and is arranged by being fixed.

This application claims priority under 35 U.S.C. § 119 to Japanese Patent Application No. 2016-045291, filed Mar. 9, 2016. The entire disclosure of Japanese Patent Application No. 2016-045291 is hereby incorporated herein by reference.

What is claimed is:

1. An image processing apparatus comprising:
a printing instruction unit which instructs printing of identical print data on a plurality of media a plurality of times;
an obtaining unit which obtains a number of printing failures in the printing performed the plurality of times;
a display unit which displays the number of printing failures by default, and with which it is possible to select whether or not to perform reprinting; and
a control unit which controls the printing instruction unit so as to perform reprinting when reprinting is selected in the display unit,
wherein the display unit displays, on an acquired condition setting screen, that conditions for the reprinting are set based on a plurality of printing defect types such that it is possible to select whether or not to perform reprinting of each of the plurality of printing defect types, and
the control unit controls the printing instruction unit to perform reprinting of a particular printing defect type when the reprinting of the particular printing defect type is selected in the display unit.

2. The image processing apparatus according to claim 1, wherein an option to change the conditions based on luminance of a printed result is displayed on the acquired condition setting screen.

3. The image processing apparatus according to claim 1, wherein an option to change the conditions based on dot omission in a printed result is displayed on the acquired condition setting screen.

4. The image processing apparatus according to claim 1, wherein an option to change the conditions based on hue of a printed result is displayed on the acquired condition setting screen.

5. An image processing method comprising:
instructing printing of identical print data on a plurality of media a plurality of times;
obtaining a number of printing failures in the printing performed the plurality of times;
displaying the number of printing failures is displayed by default, and providing an option to perform reprinting; and
performing reprinting, when reprinting is selected after the displaying,
wherein the displaying the acquired condition setting screen includes displaying, on an acquired condition setting screen, that conditions for the reprinting are set based on a plurality of printing defect types so as to provide an option to perform reprinting of each of the plurality of printing defect types, and
the performing the reprinting includes performing, when reprinting of a particular printing defect type is selected after the displaying, the reprinting of the particular printing defect type.

6. The image processing method according to claim 5, wherein the displaying the acquired condition setting screen includes displaying, on the acquired condition setting screen, an option to change the conditions based on luminance of a printed result.

7. The image processing method according to claim 5, wherein the displaying the acquired condition setting screen includes displaying, on the acquired condition setting screen, an option to change the conditions based on dot omission in a printed result.

8. The image processing method according to claim 5, wherein the displaying the acquired condition setting screen includes displaying, on the acquired condition setting screen, an option to change the conditions based on hue of a printed result.

9. A printing system comprising:
memory;
a printing instruction unit which instructs printing of identical print data on a plurality of media a plurality of times;
an obtaining unit which obtains a number of printing failures in the printing performed the plurality of times;
a display unit which displays the number of printing failures by default, and with which it is possible to select whether or not to perform reprinting; and
a control unit which controls the printing instruction unit so as to perform reprinting when reprinting is selected in the display unit,
wherein the display unit displays, on an acquired condition setting screen, that conditions for the reprinting are set based on a plurality of printing defect types such that it is possible to select whether or not to perform reprinting of each of the plurality of printing defect types, and
the control unit controls the printing instruction unit to perform reprinting of a particular printing defect type when the reprinting of the particular printing defect type is selected in the display unit.

10. The printing system according to claim 9, wherein an option to change the conditions based on luminance of a printed result is displayed on the acquired condition setting screen.

11. The printing system according to claim 9,
wherein an option to change the conditions based on dot omission in a printed result is displayed on the acquired condition setting screen.

12. The printing system according to claim 9,
wherein an option to change the conditions based on hue of a printed result is displayed on the acquired condition setting screen.

\* \* \* \* \*